Jan. 31, 1961  R. A. WYMAN  2,969,853
AIR-LINE OILER

Filed Dec. 18, 1956  2 Sheets-Sheet 1

INVENTOR:
ROBERT A. WYMAN
BY Charles F. Osgood,
ATTORNEY

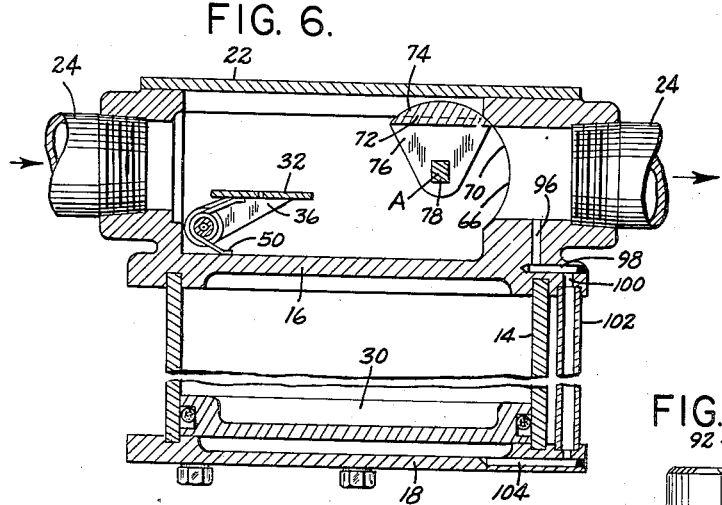
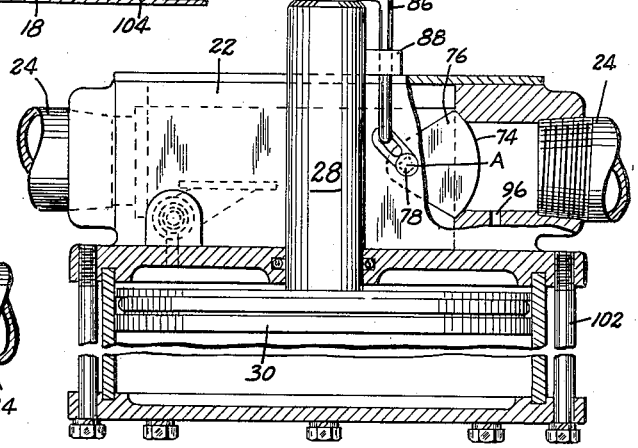
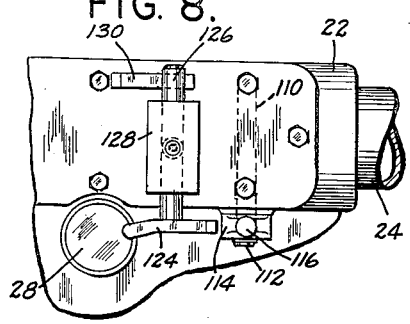
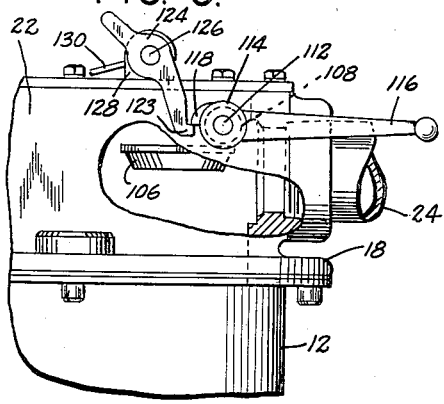
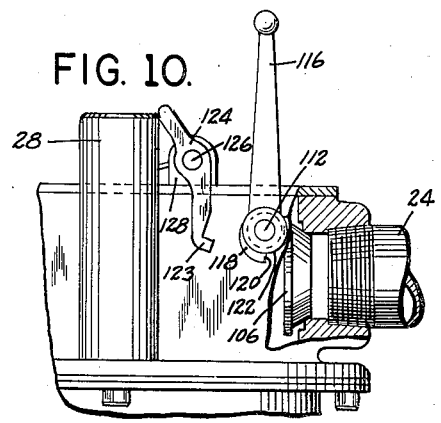

United States Patent Office 2,969,853
Patented Jan. 31, 1961

2,969,853
AIR-LINE OILER

Robert A. Wyman, Marion, Ohio, assignor to Joy Manufacturing Company, Pittsburgh, Pa., a corporation of Pennsylvania Filed Dec. 18, 1956, Ser. No. 629,089

5 Claims. (Cl. 184—55)

This invention relates to devices for automatically controlling air-lubricant intermixtures in air supply systems for pneumatic tools and the like, and more particularly to lubricating devices of the air-line oiler type.

In devices of this general character it is customary to interpose an oil reservoir in the air supply conduit of the tool and to utilize the pressure or flowing characteristics of the air within the conduit to subject the oil in the reservoir to an increased pressure for introduction into the air conduit.

Generally too, the amount of oil introduced into the air stream is not determined by the amount of air flowing in the supply conduit but rather it is made constant and, simply according to presence or absence of the air flow in the conduit. In other words, oil is dispersed in the air stream at a constant rate regardless of the pressure or flow characteristics which may vary between the widely spaced working-range limits of a compressor. Therefore it is the principal object of the present invention to provide an airline oiler which automatically controls the amount of lubricant to an air stream for a pneumatic tool in accordance with the amount of air introduced into the air-line oiler.

In devices of this character the amount of oil contained in the reservoir is usually determined by the total time of operation to which the tool was subjected, and in more recent times, a signal or an alarm has been provided to warn the operator of the condition of the oil supply. In the former case successful continued lubrication of the tool is seriously endangered, since, at most, success will be dependent upon quality guesswork. In the latter case there is introduced the hit-and-miss chance that the alarm will not be seen or heard by the operator, or the possibility that a careless operator may risk the chance to proceed a little farther in his work in hopes that he may stretch the ride on the "empty" gauge reading. Therefore another object of the present invention is to automatically cut off the air stream to a pneumatic apparatus in the event that the oil supply for the air stream has diminished to an unsafe limit.

The present invention takes the form of an air oiler which includes a pair of air flow valves serially arranged in a housing, an oil reservoir and a piston movable therein in accordance with the pressure differential on either side of the piston head. One side of the piston head is subjected to the air pressure on the downstream side of one of the valves, and the other side of the head, being somewhat smaller in area than the first side, is subjected to the pressure of the oil being forced into the air stream between the valves. One of the valves is utilized to control the amount of oil injected into the oil stream in accordance with the amount of air passing to the tool to-be-operated while the other valve is utilized to cut off the air stream in the event the supply of oil is low.

Other objects and features of the invention will be apparent from the following description when read in conjunction with the accompanying drawings wherein:

Fig. 6 is a sectional view taken along the line 6—6 in Fig. 1;

Fig. 7 is a view similar to that of Fig. 2 but shows some of the parts in different positions;

Fig. 8 is a fragmentary plan view of a modified outflow valve for the present invention;

Fig. 9 is a fragmentary side elevation, with parts broken away, of the modified valve of Fig. 8 showing the valve in one position of operation; and Fig. 10 is a view similar to that of Fig. 9 but shows the valve and the parts of the control therefor in another controlling position.

Figure 1:
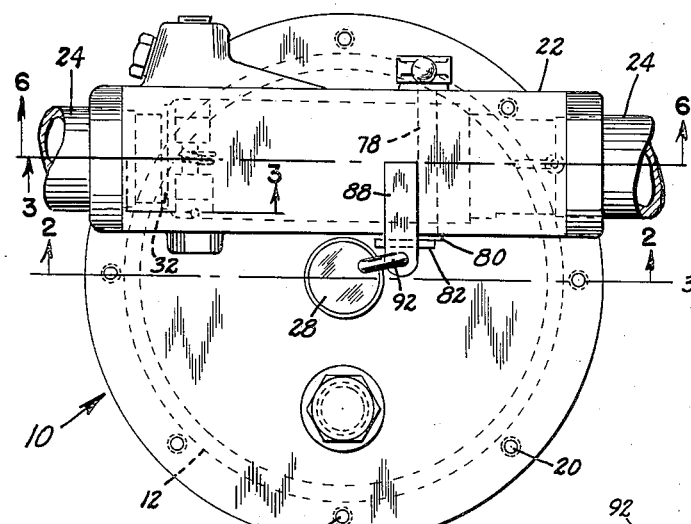
Fig. 1 is a plan view of the air-oiler of the present invention showing the general arrangement of the parts thereof.

Referring more particularly to Figs. 1 to 7, inclusive, an air-line oiler generally designated by the reference numeral 10 is shown as having an oil reservoir 12, preferably cylindrical in shape, and including a side wall 14 and top and bottom walls 16 and 18 respectively.

The walls 16 and 18 are fastened in spaced positions by bolts 20 with the cylindrical side wall 14 fastened therebetween in a leakproof relationship. Any suitable sealing device (not shown) may be incorporated between the joints of the walls 14, 16, 18 in order to insure the leakproof seal therebetween.

Figure 3:
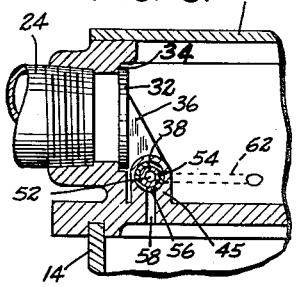
Fig. 3 is a fragmentary sectional view of the oil control valve of the present invention taken along the line 3—3 in Fig. 1.

The top wall 16 is integrally formed with a conduit 22 across the top and to one side of the center thereof, as shown in Fig. 3 and threadedly connected to the ends of the conduit 22 is an air supply conduit 24 which may be utilized for supplying a pneumatic tool or other apparatus of similar character with air from a suitable source (not shown). The top wall 16 is also formed centrally thereof with an opening 26 which slidingly accommodates a hollow plunger or piston rod 28 mounted on a piston 30 reciprocably retained in the reservoir 12. As shown in Fig. 1 the conduit 22 is slightly offset with respect to the longitudinal axis of the oiler 10 and it will be obvious that upon upward movement of the piston 30 and the rod 28, the latter will be able to clear the outer surface of the conduit 22.

It will be evident that the area of the lower surface of the piston 30 is greater than the area of the upper surface thereof since the upper surface of the hollow rod 28 is exposed to atmosphere. With equal pressures applied to the two surfaces of the piston, the piston will be forced upwardly by a force equal to the pressure times the area of the rod exposed to the atmosphere.

Figure 5:
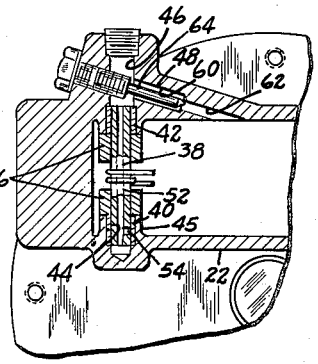
Fig. 5 is a fragmentary sectional view of the oil control valve taken along the line 5—5 in Fig. 2.
Figure 4:
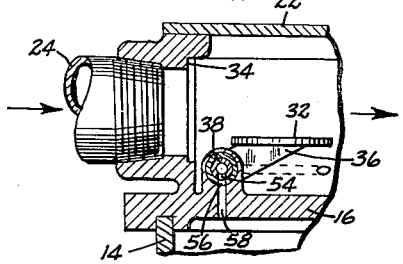
Fig. 4 is a view similar to Fig. 3, but showing the control valve in another position.

Positioned within the conduit 22 is a valve element 32 in the form of a circular flapper which is adapted to cooperate with a valve seat 34 formed interiorly at one end of the conduit 22. A pair of angle supports 36 is fastened to one side of the valve element 32 and these, in turn, are secured to a shaft 38 as shown in Figs. 4 and 5. The shaft 38 is rotatably supported at its ends in cylindrical bearings 40, 42 one of which is mounted in a well 44 formed in a projection 45 of the top wall 16 and the other in one end of an opening 46 formed in an angled portion 48 of the conduit 22. It will be noted that the well 44 and the opening 46 are in coaxial alignment thus permitting rotation of the shaft 38 with respect to the bearings 40, 42 and the valve element 32. A torsion spring 50 having one end fastened to the valve element 32 and the other end anchored on the oiler 10 serves to normally bias the valve element against its seat 34.

As shown in Figs. 3, 4 and 5, the shaft 38 is provided with a passageway 52 extending along the longitudinal axis therefor and a small radial passageway 54 adjacent one end of the shaft and connected to the passageway 52. The passageway 54 is adapted to communicate with a peripheral opening 56 in the bearing 40 and a passage 58 formed in the top wall 16 when the shaft 38 has rotated to a predetermined position. As shown in Fig. 4, with the valve element 32 in full open position, the passageway 54, the passageway 56 and the passage 58 are all in full communication with each other and the interior of the reservoir 12. In Fig. 3, when the valve element 32 is in closed position, the passageway 54 has been rotated 90 degrees from the position shown in Fig. 4 and consequently the longitudinal passageway 52 in the shaft 38 is cut off from the reservoir 12. It will be appreciated that the valve element 32 is adapted to be opened to a nearly half open position before the passageway 52 is disposed to start its communication with the passageway 54. From this position to that of full "open" as shown in Fig. 4, the amount of opening of the passageway 52 with respect to the opening 56 will be proportional to the angle of the valve element between half open and full open positions.

In order to insure the accurate control flow of oil to the air stream flowing through the air conduit 22, for all controlling positions of the valve element 32 there is provided an oil metering device and to this end a bore 60 is formed in the portion 48 in the plane with and at an angle to the opening 46 and in communication therewith. A counterbore 62 of slightly smaller diameter connects one end of the bore 60 with the interior of the conduit 22 at a point downstream of the valve 32. The bore 60 serves to accommodate a needle valve 64 which is threadedly adjustable in the bore 60 for controlling communication between the bore 60 and the counterbore 62. Since these devices are quite common in the art further description of the metering device is unnecessary. As shown in Fig. 5, the passageway 52 in the shaft 38 is in continuous communication with the bore 60 and after the needle valve 64 has been properly adjusted, will also communicate with the interior of the conduit 22.

In operation of the oil control device it will be apparent that when the valve member 32 is in the position shown in Fig. 4 oil is permitted to flow through the passage 58, past the opening 56, through the passageways 54, 52, through the bore 60, around the point of the needle valve 64, through the counterbore 62 and into the conduit 22. After the needle valve 64 has been adjusted and fixed, the amount of oil that is allowed to flow into the conduit 22 is determined by the angular position of the valve element 32 as previously mentioned.

Figure 2:
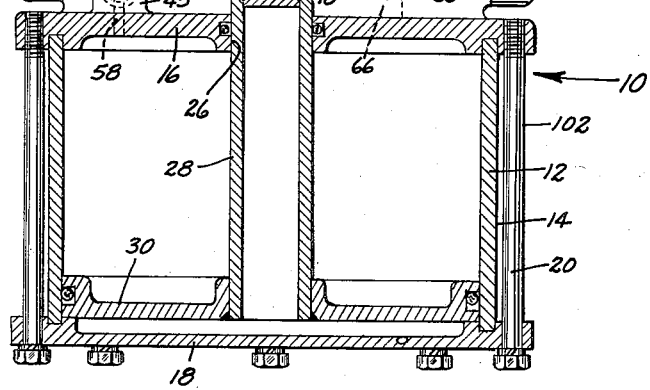
Fig. 2 is a sectional view of the oiler of Fig. 1 taken along line 2—2 in Fig. 1.

The air conduit 22 is also provided with an outflow valve for the air stream passing through the conduit, and, more specifically, there is formed at the end of the pipe remote from the valve element 32, a valve seat 66, which is bounded by upper and lower straight surfaces 68 and circular side surfaces 70, the latter being struck from a radius having its axis of rotation about an axis A. As shown in Fig. 6 a valve element or gate 72 is adapted to slide over the valve seat 66 and is formed as a segment of a right cylinder having an outer surface 74 which defines a cylindrical surface. The radius for the surface 74 is struck from the axis A and is radially held with respect to this axis and rotatably secured thereabout by a pair of triangular shaped plates 76, one in each end of the gate 72. The plates 76, adjacent an apex thereof, are each pivoted on a shaft 78 having its longitudinal axis in coincidence with the axis A and being disposed transversely of the conduit 22. The shaft may be suitably journaled on the walls of the conduit, and preferably the shaft includes an extension 80 which projects through the wall of the conduit for a short distance. (See Fig. 7.) As will be apparent, the valve element or gate 72 is adapted to rotate about the axis A and slide upon the seat 66 with relative ease. In Figs. 2 and 6, the valve element 72 is shown in its upper position, or open position, so as to permit the flow of air into the conduit 24, as shown by the arrows, and in Fig. 7, the valve element is shown in its closed position or against the seat 66. A torsion spring (not shown) may be utilized for normally biasing the valve element 72 to its open position as shown in Figs. 2 and 6.

Automatic tripping of the valve element 72 in the event the oil supply in the reservoir 12 has become depleted is accomplished by means of a lever 82 secured at one end to the extension 80 of the shaft 78 and formed with a slot 84 extending along the longitudinal axis of the lever. A transmission pin 86, slidably received in a bracket 88 secured to the conduit 22 has a lug 90 which is slidably retained in the slot 84 and a projection 92 which is adapted to engage the upper end of the plunger 28 when the same is moved upwardly. Upon engagement with the plunger 28 the pin 86 will move in an upward direction thereby rotating the lever 82 and the shaft 78 and consequently actuating the valve element 72 to a closed position (see Fig. 7). Lowering of the plunger 28 will permit the spring (not shown) associated with the shaft 78 to rotate the valve element 72 in a counterclockwise direction thereby rotating the shaft 78 and the lever 82 for lowering the pin 86 and dispose this tripping mechanism for another cycle of operation.

On the downstream side of the valve element 72 (see Fig. 6), a series of communicating passageways 96, 98, 100 are formed in the top cover plate 16 and these serve to conduct some of the air flowing through the conduit 22, and at the pressure therein, into an external tube 102 mounted adjacent the wall 14 of the reservoir 12. The tube 102 is connected to one end of a passageway 104 formed in the bottom wall 18 while the other end of the passageway 104 is in communication with the interior of the reservoir 12 beneath the piston 30. It will be apparent that as the air stream is conducted through the conduit 22, air under pressure is allowed to flow into the chamber beneath the piston 30 thus tending to force the same upwardly.

Another embodiment of the out-flow valve is shown in Figs. 8–10 and comprises a valve element 106 having an ear 108 on one side thereof cooperating with a shaft 110 for pivotally supporting the valve element. As was the case of the embodiment of Figs. 1 to 7 inclusive the shaft 110 extends transversely of the conduit 22 and projects at one end 112 beyond the wall thereof. Similarly with the first embodiment, the shaft 110 may be suitably journaled at the juncture thereof with the walls of the conduit with care being exercised that a leakproof seal be provided at the point where the shaft projects through the wall. The end 112 has a ring 114 secured thereto and rotatable therewith and a handle 116 is mounted on the ring for permitting manual rotation of the valve element 106. A cam 118 is formed on the ring and this cam terminates at its highest point by a shoulder 120 which defines a detent 122 for one end 123 of a latch 124. The latch 124 is secured at the mid-portion thereof to a shaft 126 journaled in a bearing 128 mounted on top of the conduit 22. At the end of the shaft 126 remote from the latch 124 a torsion spring 130 is mounted for biasing the shaft 126 in a counterclockwise direction as viewed in Fig. 9. In operation, the handle 116 is cranked to the right to enable the end of the latch 124 to ride upon the cam 118 and slip into the detent 122 thereby resiliently locking the handle in the position shown in Fig. 9 and the valve element in its open position. Upon upward movement of the plunger 28 the end thereof will contact the adjacent end of the latch 124 causing the same to rotate clockwise and retract the end 123 of the latch that is held in the detent 122. Under the force exerted by the spring 130 the shaft will rotate in a counterclockwise direction and the valve element 106 will be rotated to its closed position as shown in Fig. 10.

*Operation*

Assuming that the parts of the present invention are in the positions shown in Fig. 2, that is, the valve element 32 in its closed position, the valve element 72 in its open position, the piston 30 in its lowest position, the reservoir 12 filled with oil, the apparatus is in condition for the introduction of air into the system for use with a pneumatic tool or similar apparatus.

With the introduction of air into the conduit 24 the air stream will force the valve 32 open against the bias of the spring 50 and the amount of opening will be proportional to the amount of air flowing into the air conduit 22. With an air stream under pressure established in the conduit, the air under this pressure will be conducted through the passageways 96—104 and into the chamber between the piston 30 and the bottom wall 18. Simultaneously the oil in the reservoir above the piston will likewise be subjected to the same air pressure because of the open communication between the interior of the conduit 22 and the chamber above the piston as provided by the passageways 52—62, however, since the area of the lower surface of the piston is greater than that of the upper surface, the piston will be forced upwardly. Such upward movement of the piston will force oil out of the chamber of the reservoir, through the passageways 52—62 and into the air stream in the conduit 22 to be utilized in the tool to be operated. In the event the oil in the reservoir has become depleted, the end of the piston plunger 28 will contact the projection 92 on the rod 86 to move the same upwardly for closing the valve 72.

In the embodiment of Figs. 8 to 10 inclusive, with the valve element 106 in its locked open position, the plunger 28, near the end of its upward travel, will engage the adjacent end of the latch 24 rotating the same in a clockwise direction to release the end 123 from the shoulder and permit closing of the valve element 106 under the bias of spring 130.

It will be apparent that, due to the presence of the control passageways 52—58, the flow of oil into the conduit 22 may be controlled by the air stream flowing past the valve element without any regard to the working range of pressures of the air supply. In addition, a complete shutdown of the air supply to the tool is accomplished in the event the oil supply is exhausted thus eliminating any damage to the tool that may be caused by lack of oil during running thereof.

While there are in this application specifically described a preferred form which the invention may assume in practice and one modification thereof, it will be understood that this form and modification of the same are shown for purposes of illustration, and that the invention may be further modified and embodied in various other forms without departing from its spirit or the scope of the appended claims.

What I claim is:

1. An air-line lubricator comprising, means forming a passage adapted to be connected between a source of air under pressure and a device to be operated by air flow from said source, a reservoir for a lubricant having a conduit for delivery of lubricant therefrom to an air stream passing through said passage, means operative in response to the pressure of the air stream in said passage for creating a lubricant pressure exceeding the pressure in said passage for introducing lubricant into said passage, control means for controlling the amount of lubricant introduced into said passage, valve means responsive to the rate of flow of the air stream through said passage for actuating said control means between various controlling positions thereby regulating the amount of lubricant introduced into said passage in accordance with such rate of flow, and valve means in said passage constructed to be normally biased to an open position being controlled by the exhaustion of lubricant in said reservoir for moving said valve means to its closed position and closing said passage.

2. An air-line oiler having a lubricant reservoir and means forming a passage for connection in an air-line between a source of air under pressure and a device to be operated by air flow from said source, said lubricant reservoir having a movable wall subjected at its opposite sides to the pressure in said passage and movable to displace lubricant to said passage, conduits respectively connected to the upstream and the downstream ends of said passage communicating with said reservoir with the downstream one of said conduits communicating with the side of said wall opposite the side thereof contacted by the lubricant, control means cooperable with said upstream conduit to vary the amount of lubricant introduced into said passage, and valve means responsive to the rate of flow of the air stream through said passage for actuating said control means to various control positions to regulate the amount of lubricant introduced into said passage.

3. An air-line lubricator comprising means forming a passage adapted to be connected between a source of air under pressure and a device to be operated by air flow from said source, a reservoir for a lubricant having a first passageway connectible to a second passageway extending in part through a pivotable member for permitting variable delivery of lubricant therefrom to an air stream passing through said passage, means operative in response to the pressure of the air stream in said passage for creating a lubricant pressure exceeding the pressure in said passage for introducing lubricant into said passage, valve means rigidly secured to said pivotable member, said valve means being responsive to the rate of flow of the air stream through said passage for moving said pivotable member to various positions to vary the connection between said passageways and thereby regulate the amount of lubricant introduced into said passage in accordance with such rate of flow through the passage.

4. An air-line lubricator comprising, means forming a passage adapted to be connected between a source of air under pressure and a device to be operated by air flow from said source, a reservoir for a lubricant having a conduit for delivery of lubricant therefrom to an air stream passing through said passage, means operative in response to the pressure of the air stream in said passage for creating a lubricant pressure exceeding the pressure in said passage for introducing lubricant into said passage, control means for controlling the amount of lubricant introduced into said passage, valve means responsive to the rate of flow of the air stream through said passage for actuating said control means between various controlling positions thereby regulating the amount of lubricant introduced into said passage in accordance with such rate of flow through said passage, and means controlled by the exhaustion of lubricant in said reservoir for closing said passage.

5. An air-line oiler having, a lubricant reservoir and means forming a passage for connection in an air line between a source of air under pressure and a device to be operated by air flow from said source, said lubricant reservoir having a movable wall subjected at its opposite sides to the pressure in said passage and movable to displace lubricant to said passage, conduits respectively connected to the upstream and the downstream ends of said passage communicating with said reservoir with one of said conduits communicating with the side of said wall opposite the side thereof contacted by the lubricant, control means for controlling the amount of lubricant introduced into said passage, valve means responsive to the rate of flow of the air stream through said passage for actuating said control means between various controlling positions thereby regulating the amount of lubricant introduced into said passage, and means controlled by movement of said wall for effecting closure of said passage when the quantity of lubricant in said reservoir falls below a minimum.

References Cited in the file of this patent

UNITED STATES PATENTS

| | | |
|---|---|---|
| 1,339,798 | Thompson | May 11, 1920 |
| 2,105,490 | Noble | Jan. 18, 1938 |
| 2,105,492 | Gartin | Jan. 18, 1938 |
| 2,430,361 | O'Farrell | Nov. 4, 1947 |
| 2,797,772 | Beckmann | July 2, 1957 |